(12) United States Patent
Kim et al.

(10) Patent No.: US 12,512,127 B2
(45) Date of Patent: Dec. 30, 2025

(54) ELECTRONIC DEVICE AND OPERATION METHOD OF ELECTRONIC DEVICE

(71) Applicant: SAMSUNG ELECTRONICS CO., LTD., Suwon-si (KR)

(72) Inventors: Hyunwook Kim, Suwon-si (KR); Hyunchul Yang, Suwon-si (KR); Sanghoon Lee, Suwon-si (KR); Hangil Moon, Suwon-si (KR); Jaeha Park, Suwon-si (KR); Kali Charan Gajula, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/640,974

(22) Filed: Apr. 19, 2024

(65) Prior Publication Data

US 2024/0274157 A1    Aug. 15, 2024

Related U.S. Application Data

(63) Continuation of application No. PCT/KR2022/016238, filed on Oct. 24, 2022.

(30) Foreign Application Priority Data

Oct. 22, 2021  (KR) .......................... 10-2021-0142008

(51) Int. Cl.
*G11B 27/10* (2006.01)
*G06F 3/16* (2006.01)

(52) U.S. Cl.
CPC .............. *G11B 27/10* (2013.01); *G06F 3/162* (2013.01)

(58) Field of Classification Search
CPC ................................ G11B 27/10; G06F 3/162
See application file for complete search history.

(56) References Cited

U.S. PATENT DOCUMENTS 7,295,247 B2    11/2007  Bang
7,953,118 B2     5/2011  Krantz et al.
(Continued)

FOREIGN PATENT DOCUMENTS

JP      2015-97317      5/2015
JP         6382319     12/2016
(Continued)

OTHER PUBLICATIONS

International Search Report for PCT/KR2022/016238, mailed Feb. 17, 2023, 5 pages.
(Continued)

*Primary Examiner* — Thai Q Tran
*Assistant Examiner* — Jose M Mesa
(74) *Attorney, Agent, or Firm* — Nixon & Vanderhye, P.C.

(57) ABSTRACT

An example electronic device includes a camera, a communication circuit, a memory, and at least one processor. The memory stores instructions that, when executed by the at least one processor, cause the electronic device to obtain image data using the camera, receive audio data recorded by an external electronic device and information on first audio latency from the external electronic device, determine a second audio latency required to process the received audio data by the at least one processor, determine a third audio latency based on the first audio latency and the second audio latency, determine a difference between a preset initial audio latency and the third audio latency, synchronize the audio data with the image data based at least in part on the difference, and generate an image content including the image data and the audio data based at least in part on the synchronization result.

20 Claims, 7 Drawing Sheets

(56) References Cited

U.S. PATENT DOCUMENTS

| | | |
|---|---|---|
| 8,599,235 B2 | 12/2013 | Friel et al. |
| 8,861,704 B2 | 10/2014 | Jones et al. |
| 9,003,303 B2 | 4/2015 | Jones et al. |
| 9,106,794 B2 | 8/2015 | Jones et al. |
| 9,247,191 B2 | 1/2016 | Saari et al. |
| 9,826,015 B2 | 11/2017 | Kuhn |
| 9,888,296 B2 | 2/2018 | Marck et al. |
| 10,644,122 B2 | 5/2020 | Marck et al. |
| 10,915,292 B2 | 2/2021 | Price et al. |
| 11,456,369 B2 | 9/2022 | Marck et al. |
| 2005/0019020 A1* | 1/2005 | Sato ............ H04N 7/52 375/E7.278 |
| 2006/0159276 A1* | 7/2006 | Tsutsui ............ H04S 7/302 381/17 |
| 2008/0137690 A1 | 6/2008 | Krantz et al. |
| 2011/0018959 A1 | 1/2011 | Friel et al. |
| 2011/0268418 A1 | 11/2011 | Jones et al. |
| 2014/0047025 A1 | 2/2014 | Jones et al. |
| 2014/0056570 A1 | 2/2014 | Saari et al. |
| 2015/0030150 A1 | 1/2015 | Jones et al. |
| 2015/0035994 A1* | 2/2015 | Son ............ H04N 17/04 348/189 |
| 2015/0067186 A1 | 3/2015 | Kuhn |
| 2015/0170712 A1* | 6/2015 | Redmann ............ G03B 31/02 386/207 |
| 2015/0279424 A1 | 10/2015 | Marck et al. |
| 2018/0158922 A1 | 6/2018 | Marck et al. |
| 2021/0120167 A1 | 4/2021 | Cen et al. |
| 2021/0120509 A1 | 4/2021 | Price et al. |
| 2022/0393014 A1 | 12/2022 | Marck et al. |
| 2023/0297324 A1* | 9/2023 | Yu ............ H04N 21/4852 700/94 |

FOREIGN PATENT DOCUMENTS

| | | |
|---|---|---|
| JP | 6360300 | 7/2018 |
| JP | 2021-93578 | 6/2021 |
| KR | 2011-0083360 | 7/2011 |
| KR | 10-2015-0015250 | 2/2015 |
| KR | 10-1600891 | 3/2016 |
| KR | 10-2021-0115970 | 9/2021 |
| WO | 02/23916 | 3/2002 |

OTHER PUBLICATIONS

Written Opinion of the ISA for PCT/KR2022/016238, mailed Feb. 17, 2023, 5 pages.

* cited by examiner

ELECTRONIC DEVICE AND OPERATION METHOD OF ELECTRONIC DEVICE

CROSS-REFERENCE TO RELATED APPLICATION(S)

This application is a continuation of International Application No. PCT/KR2022/016238, designating the United States, filed on Oct. 24, 2022, in the Korean Intellectual Property Receiving Office, and which is based on and claims priority to Korean Patent Application No. 10-2021-0142008, filed on Oct. 22, 2021, in the Korean Intellectual Property Office. The disclosures disclosure of each of these applications is incorporated by reference herein its entirety.

BACKGROUND

1. Field

The disclosure relates to an electronic device that processes image data and audio data and a method of operating the electronic device.

2. Description of Related Art

Recently, with the advancement of wireless communication technology, the number of cases in which multiple electronic devices are linked to provide one function or service is increasing. For example, while outputting images through a smart phone, the audio related to the images may be output through wireless earphones connected to the smart phone through wireless communication. Alternatively, while capturing images with a smart phone, audio data may be recorded using a microphone of an external device connected to the smart phone through wireless communication.

The above information is presented as background information only to assist with an understanding of the disclosure. No determination has been made, and no assertion is made, as to whether any of the above might be applicable as prior art with regard to the disclosure.

SUMMARY

When data in multiple devices is processed, errors may occur in data processing when the data processed by the multiple devices are not synchronized or are misaligned.

Aspects of the disclosure may, for example, address at least the above-mentioned problems and/or disadvantages and can provide at least the advantages described below. Accordingly, an aspect of the disclosure is to provide an electronic device and a method of operating the electronic device that may generate image content by effectively synchronizing image data and audio data when the image data and the audio data are obtained through a plurality of devices.

In accordance with various embodiments of the disclosure, an electronic device may include a camera, a communication circuit, memory, and at least one processor operatively coupled to the camera, the communication circuit, and the memory. The memory may store instructions that, when executed by the at least one processor, cause the electronic device to obtain image data using the camera; receive audio data recorded by an external electronic device and information on first audio latency from the external electronic device with which communication is established through the communication circuit; determine a second audio latency required to process the received audio data by the at least one processor; determine a third audio latency based on the first audio latency and the second audio latency; determine a difference between a preset initial audio latency and the third audio latency; synchronize the audio data with the image data based at least in part on the difference; and generate image content including the image data and the audio data based at least in part on a synchronization result.

In accordance with various embodiments of the disclosure, a method of operating an electronic device includes obtaining image data using a camera; receiving audio data recorded by an external electronic device and information on first audio latency from the external electronic device; determining a second audio latency required to process the received audio data by the electronic device; determining a third audio latency based on the first audio latency and the second audio latency; determining a difference between a preset initial audio latency and the third audio latency; synchronizing the audio data with the image data based at least in part on the difference; and generating image content including the image data and the audio data based at least in part on the synchronizing.

In accordance with various embodiments of the disclosure, a non-transitory recording medium may store computer-readable instructions, the instructions, when executed by an electronic device, causing an electronic device to obtain image data using a camera; receive audio data recorded by an external electronic device and information on first audio latency from the external electronic device; determine a second audio latency required to process the received audio data by the electronic device; determine a third audio latency based on the first audio latency and the second audio latency; determine a difference between a preset initial audio latency and the third audio latency; synchronize the audio data with the image data based at least in part on the difference and generate image content including the image data and the audio data based at least in part on a synchronization result.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In connection with the description of the drawings, the same or similar reference numerals may be used for the same or similar components.

DETAILED DESCRIPTION

Figure 1:
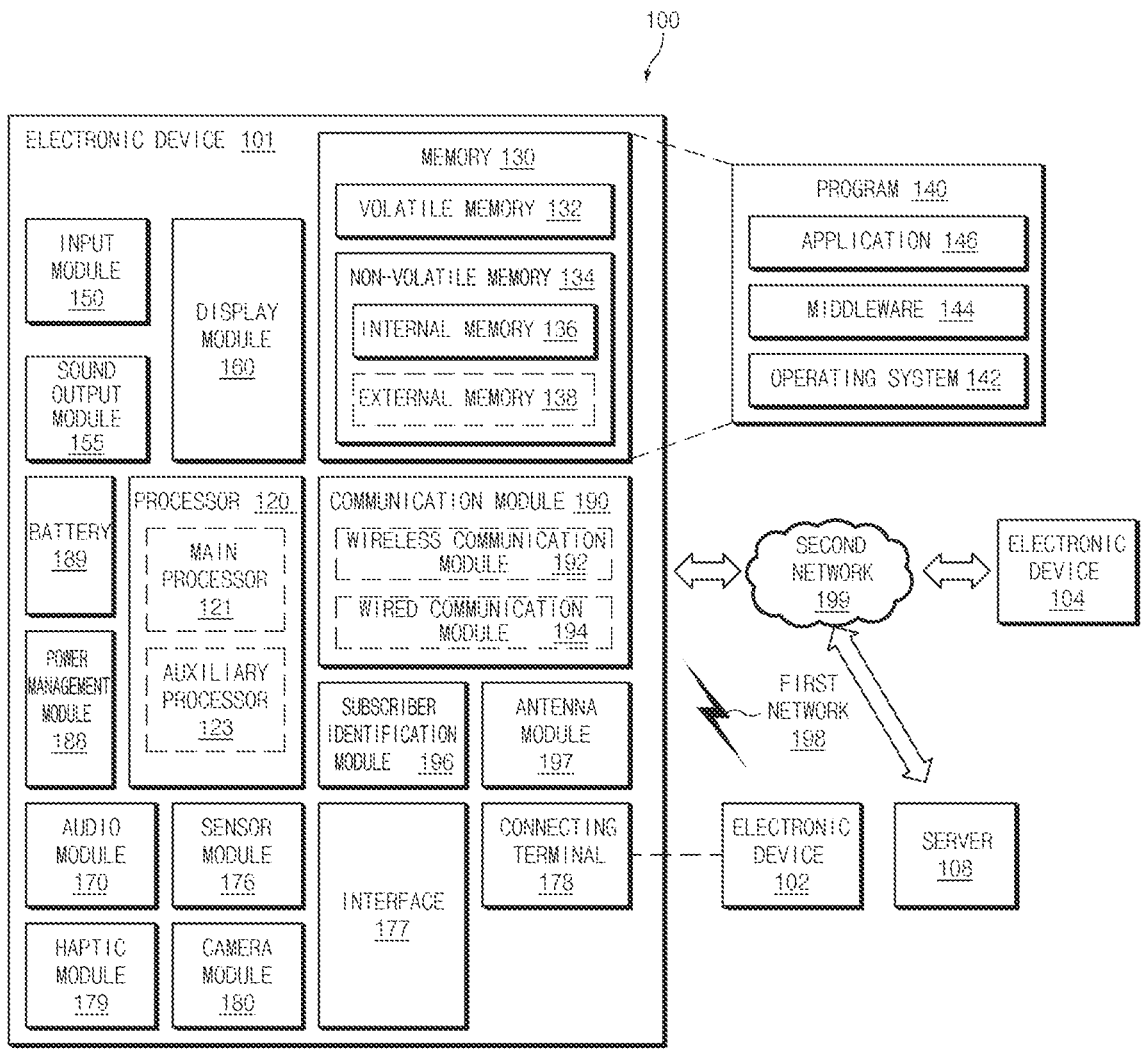
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. In various embodiments, some (e.g., the sensor module 176, the camera module 180, or the antenna module 197) of the components may be integrated into one component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. When the electronic device 101 includes the main processor 121 and the auxiliary processor, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural network processing device) may include a hardware structure specified for processing an artificial intelligence (AI) model. The AI model may be generated through machine learning. The learning may be performed by the electronic device 101 performing the AI, and may be performed through an additional server (e.g., the server 108). A learning algorithm may include, for example, a supervised learning algorithm, an unsupervised learning algorithm, a semi-supervised learning algorithm, or a reinforcement learning algorithm, but the disclosure is not limited thereto. The AI model may include a plurality of artificial neural network (ANN) layers. The ANN may include a deep neural network (DNN), a convolutional neural network (CNN), a recurrent neural network (RNN), a restricted Bolltzman machine (RBM), a deep belief network (DBN), a bidirectional recurrent deep neural network (BRDNN), deep Q-networks or a combination of the above networks, but the disclosure is not limited thereto. The AI model may additionally or alternatively include a software structure, in addition to a hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other components (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for an incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., the electronic device 102) (e.g., speaker of headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). The corresponding communication module among these communication modules may communicate with the external electronic device via the first network 198 (e.g., a short-range communication network, such as Bluetooth™, wireless-fidelity (WiFi) direct, or infrared data association (IrDA)) or the second network 199 (e.g., a long-range communication network, such as a legacy cellular network, 5G network, next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network and a next-generation communication technology, for example, a new radio (NR) access technology after a 4G network. The NR access technology may support high-speed transmission for high capacity data (enhanced mobile broadband; eMBB), terminal power minimizing and multiple terminal access (massive machine type communication; mMTC), or ultra-reliable and low-latency communications (URLLC). The wireless communication module 192 may support a high-frequency band (e.g., mmWave band) to achieve, for example, a higher data rate. The wireless communication module 192 may support various technologies, for example, beamforming, massive multiple-input and multiple-output (MIMO), Full-dimensional MIMO, an array antenna, analog beamforming, or a large-scale antenna, to secure performance in high frequency bands. The wireless communication module 192 may support various requirements defined in the electronic device 101, the external electronic device (e.g., the electronic device 104) or the network system (e.g., the second network 199). According to an embodiment, the wireless communication module 192 may support a peak data rate (e.g., 20 Gbps or more) for eMBB realization, loss coverage (e.g., 164 dB or less) for mMTC realization, or U-plane latency (e.g., 0.5 ms or less, or the round trip of 1 ms or less in each of a downlink (DL) and an uplink (UL)) for URLCC realization.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., PCB). According to an embodiment, the antenna module 197 may include a plurality of antennas (e.g., an array antenna). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., a bottom surface) of the printed circuit board, or disposed adjacent to the first surface to support the specific high frequency band (e.g., mmWave band), and a plurality of antennas (e.g., an array antenna) disposed on a second surface (e.g., a top surface or a side surface) of the printed circuit board or disposed adjacent to the second surface to transmit or receive a signal having the specified high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-latency service by using, for example, distributed computing or mobile edge computing. According to various embodiments, the external electronic device 104 may include the Internet of things (IoT). The server 108 may be an artificial server using machine learning and/or a neural network. According to an embodiment, the external electronic device 104 or the server 108 may be included in the second network 199. The electronic device 101 may be applied to an artificial intelligence service (e.g., a smart home, a smart city, a smart car, or healthcare service) based on the 5G communication technology and the IoT-related technology.

Figure 2:
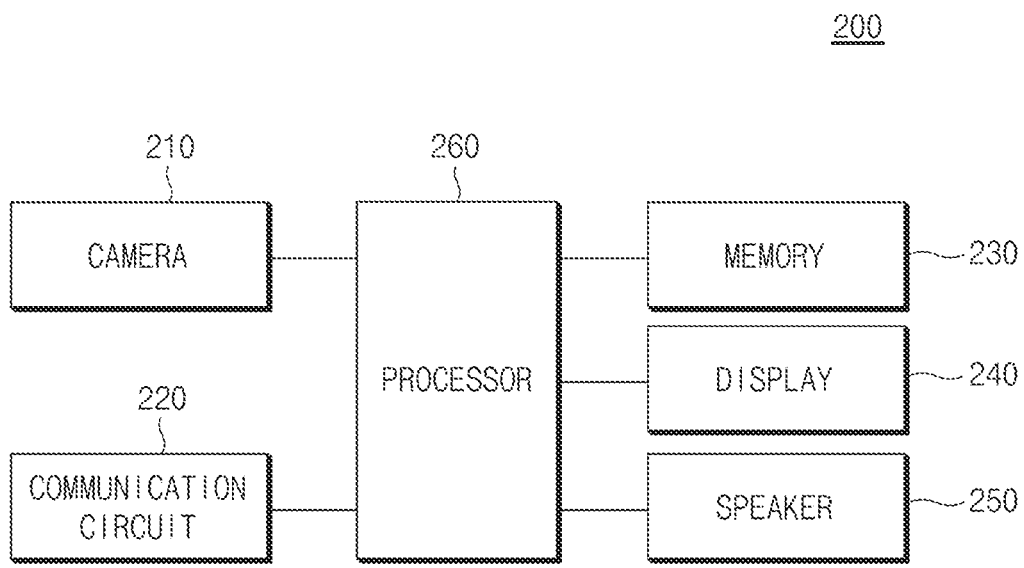
FIG. 2 is a block diagram of an example electronic device according to various embodiments.

FIG. 2 is a block diagram of an example electronic device according to various embodiments.

According to an embodiment, an electronic device 200 (e.g., a portable terminal, the electronic device 101 of FIG. 1) may include a camera 210 (e.g., the camera module 180 of FIG. 1), a communication circuit 220 (e.g., the communication module 190 of FIG. 1), memory 230 (e.g., the memory 130 of FIG. 1), a display 240 (e.g., the display module 160 of FIG. 1), a speaker 250 (e.g., the sound output module 155 of FIG. 1), and a processor 260 (e.g., the processor 120 of FIG. 1).

According to an embodiment, the camera 210 may obtain image data. For example, the camera 210 may generate image data by photographing the exterior of the electronic device 200. According to an embodiment, the photographing operation of the camera 210 may be performed simultaneously with the recording operation of an external electronic device (e.g., wireless earphones, a wireless headset, or a wearable device). For example, while the electronic device 200 records sound through an external electronic device, the camera 210 may capture an image corresponding to the sound recorded by the external electronic device. For example, in this specification, the image data may refer, for example, to data including only image-related information (e.g., image frames and/or image-related metadata) without audio-related information, the audio data may refer, for example, to data including audio-related information (e.g., audio frames and/or audio-related metadata) without image-related information, and image content may refer, for example, to data including both image-related information and audio-related information.

According to an embodiment, the communication circuit 220 may transmit and receive data with an external electronic device (e.g., wireless earphones, a wireless headset, or a wearable device). According to an embodiment, the communication circuit 220 may support Bluetooth communication and/or BLE (Bluetooth low energy) communication. For example, the communication circuit 220 may receive audio data and/or latency information (e.g., information on a first audio latency) of the audio data from an external electronic device. For example, the communication circuit 220 may receive an audio packet including audio data and latency information (e.g., information on the first audio latency) of the audio data from an external electronic device. According to an embodiment, the first audio latency may refer, for example, to a time taken from a time when the external electronic device receives sound through the microphone included in the external electronic device to a time (e.g., just before the external electronic device transmits the audio data) when the external electronic device transmits audio data to the electronic device 200, and may have a value that varies depending on the communication environment.

According to an embodiment, memory 230 may store various data (e.g., image data, audio data, image content, an initial audio latency, a first audio latency, a second audio latency, a third audio latency, and/or a latency table) used in an operation of the electronic device 200, at least temporarily. According to an embodiment, the memory 230 may include a receiving buffer that at least temporarily stores the audio data received from an external device. According to an embodiment, the memory 230 may store instructions that allow the electronic device 200 to operate when executed by the processor 260.

According to an embodiment, the display 240 may visually provide data to a user. For example, the display 240 may output image data and/or images related to an image content.

According to an embodiment, the speaker 250 may provide data audibly to a user. For example, the speaker 250 may output audio data and/or an audio related to an image content.

According to an embodiment, the processor 260 may set an initial audio latency. According to an embodiment, the initial audio latency may, for example, be a reference time for holding image data and synchronizing the audio data with the image data. For example, the processor 260 may set the initial latency such that a time when the electronic device 200 acquires the image data corresponds to a time (e.g., a time when the external electronic device receives sound corresponding to audio data through a microphone) when the external electronic device records audio data related to the image data. For example, the initial latency may have a trade-off relationship with a sound interruption of audio data. For example, the processor 260 may set the initial latency, for example, by setting the initial buffering degree of the receiving buffer in consideration of synchronization accuracy between image data and audio data and requirements for preventing the sound interruption. For example, when the electronic device is connected to an external electronic device, the processor 260 may set the initial latency before obtaining image data by the electronic device and recording audio data by the external electronic device. For example, the processor 260 may set the initial latency at the time of Bluetooth negotiation (BT negotiation) when the electronic device establishes a Bluetooth (BT) connection with an external electronic device. For example, the processor 260 may set reference levels (e.g., a capacity of audio data to be stored in the receiving buffer, and/or a time for storing the audio data in the receiving buffer) of the receiving buffer to set the corresponding initial latency. For example, when a processing rate of audio data (e.g., a rate of playing audio data to synchronize image data with audio data (hereinafter referred to as a 'playback rate of audio data')) is faster than a preset initial audio latency, the corresponding audio data may be played faster than the image data, causing the image data and audio data to be out of synchronization (hereinafter referred to as a 'sync'), and when the processing rate of the audio data (e.g., the playback rate of the audio data) is slower than the preset initial audio latency, the corresponding audio data may be played later than the image data, causing the image data and the audio data to be out of sync.

According to an embodiment, the processor 260 may determine a real-time audio latency (e.g., the third audio latency) based on information on the audio latency (e.g., the first audio latency) related to the external electronic device received from the external electronic device and the audio latency (e.g., the second audio latency) related to the electronic device 200. For example, the processor 260 may determine the real-time audio latency by adding the audio latency related to the electronic device and the audio latency related to the external electronic device.

For example, the audio latency related to an external electronic device may refer, for example, to a time taken from a time when the external electronic device receives an external sound through the microphone of the external electronic device to a time (or just before transmission to the electronic device) when audio data generated by recording the external sound is transmitted to the electronic device. For example, the audio latency (e.g., the first audio latency) related to the external electronic device may change depending on a communication environment (or communication state) between the electronic device 200 and the external electronic device. For example, the rate at which audio data is output from the transmission buffer of the external electronic device varies depending on the communication environment, so the audio latency related to the external electronic device may change.

For example, the audio latency (e.g., the second audio latency) related to the electronic device 200 may include a time required to process the audio data output from the receiving buffer according to at least one of a time taken for audio data stored in the receiving buffer and received from an external electronic device to be output from the receiving buffer depending on the state of the receiving buffer of the electronic device 200, performance of the electronic device 200, or process of processing audio data. For example, the state (e.g., the amount of audio data stored in the receiving buffer) of the receiving buffer may be determined based on at least some of the communication environment and communication state of the electronic device 200 and the external electronic device. For example, when the communication environment is relatively good, an output rate (or a period) of audio data output from the receiving buffer and a rate (e.g., a rate of receiving the audio data from an external electronic device (or a period)) at which the audio data is stored in the receiving buffer may be maintained uniform, and the time required for audio data to be output from the receiving buffer may be maintained uniform. As another example, when the communication environment is relatively poor, the output rate (or the period) of the audio data output from the receiving buffer is maintained uniform, while the rate (e.g., the rate of receiving the audio data from an external electronic device (or the period)) at which the audio data is stored in the receiving buffer changes irregularly, the time required for the audio data to be output from the receiving buffer may change.

For example, the processor 260 may refer to a latency table stored in the memory 230 and may determine an audio latency (hereinafter referred to as an 'audio latency internal to the electronic device 200) depending on at least one of the performance of the electronic device 200 or the process of processing the audio data. For example, the audio latency internal to the electronic device 200 may generally have a fixed value depending on the performance of the electronic device 200 and/or the process (e.g., steps or operations of processing the audio data) by which the electronic device 200 processes the audio data. For example, the latency table may include information on the audio latency having a fixed value depending on the performance of the electronic device 200 and/or the process (e.g., steps or operations of processing the audio data) by which the electronic device 200 processes the audio data. According to an embodiment, the processor 260 may determine a difference between the initial audio latency and the real-time audio latency (e.g., the third audio latency). According to an embodiment, the processor 260 may adjust (or change) the audio latency (e.g., the second audio latency) related to the electronic device such that the real-time audio latency (e.g., the third audio latency) follows the preset initial audio latency based on the difference between the initial audio latency and the real-time audio latency (e.g., the third audio latency). For example, the processor 260 may adjust the real-time audio latency (e.g., the third audio latency) by adjusting the audio latency (e.g., the second audio latency) related to the electronic device. For example, the processor 260 may adjust a method (e.g., a playback rate of audio data to synchronize the audio data with the image data) of processing the audio data such that the real-time audio latency (e.g., the third audio latency) corresponds to the initial audio latency. For example, when the real-time audio latency is shorter than the preset initial audio latency, the audio data corresponding to the image data may be played faster than the image data, causing the image data and audio data to be out of sync, and when the real-time audio latency is longer than the preset initial audio latency, the audio data corresponding to the image data may be played later than the image data, causing the image data and audio data to be out of sync. For example, the processor 260 may adjust the real-time audio latency (e.g., the third audio latency) to correspond to the initial audio latency to prevent the image data and audio data from being (or becoming) out of sync.

According to an embodiment, the processor 260 may control the real-time audio latency (e.g., the third audio latency) to follow the preset initial audio latency by, for example, adjusting the processing rate (e.g., the playback rate of the audio data) of the audio data, by adjusting a sampling rate of the audio data, by adjusting a reference level of the receiving buffer that stores the audio data received from an external electronic device, by adjusting a time to store the audio data in the receiving buffer, and/or by adjusting a rate of outputting the audio data stored in the receiving buffer through a decoder. According to an embodiment, the processor 260 controls the processing process (e.g., the playback rate of the audio data) of the audio data such that the real-time audio latency follows the initial audio latency, thereby synchronizing the image data with the audio data. For example, the processor 260 may control the processing process (e.g., the playback rate of the audio data) of the audio data such that the real-time audio latency follows the initial audio latency to sync the audio data with the image data which is adjusted based on the preset initial audio latency such that they are not out of sync.

According to an embodiment, the processor 260 may synchronize the image data with the audio data and may generate image content including the image data and the audio data based at least in part on the synchronization result. For example, the image content may include the image data, the audio data, and data related to synchronization between the image data and the audio data. For example, the processor 260 may generate the image content by linking and including the image data, the audio data, and data related to synchronization between the image data and the audio data in one file format. According to an embodiment, the processor 260 may store the generated image content in the memory 230 or an external device (e.g., an external server (e.g., the server 106 of FIG. 1)).

According to an embodiment, the electronic device 200 may prevent (or reduce the possibility of) the audio data and the image data which is adjusted based on the initial audio latency, from becoming out of sync, and may generate high-quality image content by determining the real-time audio latency (e.g., the third audio latency) based on the audio latency (e.g., the first audio latency) related to the external electronic device and the audio latency (e.g., the second audio latency) related to the electronic device 200 and by adjusting the processing method of the audio data such that the real-time audio latency follows the preset initial audio latency.

Figure 3:
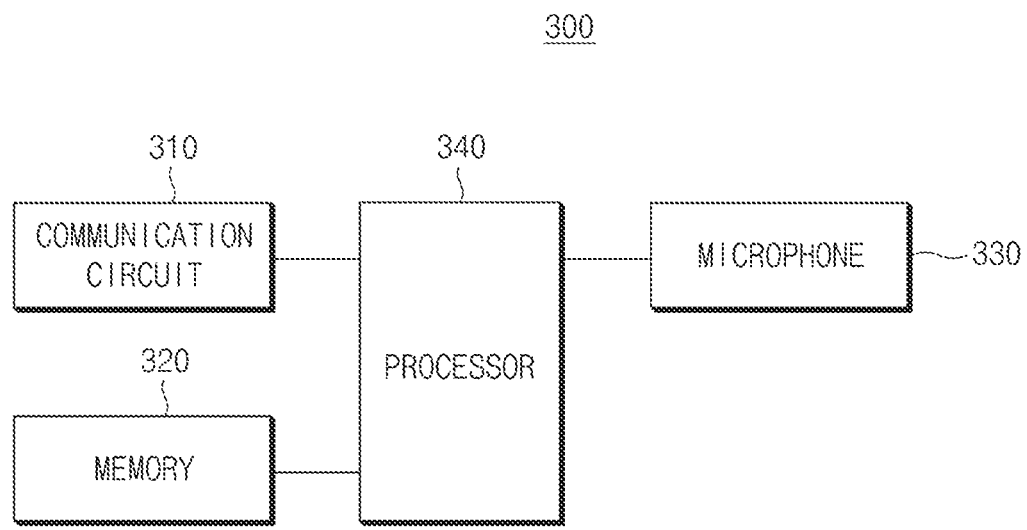
FIG. 3 is a block diagram of an example electronic device according to various embodiments.

FIG. 3 is a block diagram of an example electronic device according to various embodiments.

According to an embodiment, an electronic device 300 (e.g., wireless earphones, wireless headset, or wearable device) (e.g., the electronic device 102 or 104 of FIG. 1) may include a communication circuit 310, memory 320, a microphone 330, and a processor 340.

According to an embodiment, the electronic device 300 may be an electronic device corresponding to one side (e.g., a right side) of wireless earphones including a left-right pair. For example, an external electronic device that communicates through the communication circuit 310 of the electronic device 300 may include a portable terminal (e.g., the electronic device 200 of FIG. 2) and/or the electronic device 300 on the other side (e.g., a left side). According to an embodiment, the electronic device 300 may include a wearable device (e.g., a wireless headset) that supports, for example, a true-wireless stereo (TWS) method. According to an embodiment, a wearable device supporting the TWS method may include a plurality of microphones (e.g., left/ right microphones) and may provide a binaural (stereo) recording function using the plurality of microphones.

According to an embodiment, the communication circuit 310 may transmit and receive data with an external electronic device (e.g., a portable terminal). According to an embodiment, the communication circuit 310 may support Bluetooth communication and/or BLE (Bluetooth low energy) communication. For example, the communication circuit 310 may transmit the audio data and/or latency information (e.g., information on the first audio latency) of the audio data to an external electronic device. For example, the communication circuit 310 may transmit an audio packet including the audio data and the latency information of the audio data to the external electronic device.

According to an embodiment, memory 320 may at least temporarily store various data (e.g., the audio data and/or the first audio latency) used in the operation of the electronic device 300. According to an embodiment, the memory 320 may include an audio buffer that at least temporarily stores the audio data generated based on external sounds received through the microphone 330, and a transmission buffer that at least temporarily stores the audio data to be transmitted to the external electronic device. According to an embodiment, the memory 320 may store instructions that allow the electronic device 300 to operate when executed by the processor 340.

According to an embodiment, the microphone 330 may receive sound from outside the electronic device 300. According to an embodiment, an analog audio signal received through the microphone 330 may be converted into digital audio data through an analog to digital converter (ADC) (not illustrated). According to an embodiment, the receiving operation of the microphone 330 may be performed simultaneously with the image capturing operation of the external electronic device (e.g., the portable terminal). For example, while the camera of the external electronic device acquires image data, the microphone 330 may receive sound corresponding to the image data acquired by the camera of the external electronic device.

According to an embodiment, the processor 340 (including, e.g., processing circuitry) may transmit the audio data to the external electronic device through the communication circuit 310. According to an embodiment, the processor 340 may transmit information on the latency (e.g. the first audio latency) required from a time when an external sound is received through the microphone 330 via the communication circuit 310 to a time when the audio data is processed and transmitted to the external electronic device (or immediately before transmitting the audio data to the external electronic device) to the external electronic device. For example, the latency (e.g., the first audio latency) required in the electronic device 300 may include a fixed latency (e.g., a time required from a time when sound is received through the microphone 330 to a time when the audio data is processed internally in the electronic device 300 and is ready for transmission to an external electronic device) and variable latency (e.g., a time required to transmit the audio data (or audio packets containing the audio data) to the external electronic device). For example, the variable latency may vary depending on the communication environment (or the communication state between the electronic device 300 and an external electronic device). According to an embodiment, the processor 340 may identify a total latency (e.g., the first audio latency) required in relation to the audio data in the electronic device 300 and may transmit information on the total latency through the communication circuit 310 in real time (e.g., whenever latency information changes) to the external electronic device, based on a request from the external electronic device, and/or periodically.

When generating the audio data and transmitting the audio data to an external electronic device, the electronic device 300 according to an embodiment may, for example, allow the external electronic device to determine information on the audio latency that varies depending on the communication environment and to maintain synchronization between the audio data and the image data by identifying information on latency that may vary depending on the communication environment and providing the information on the latency to the external electronic device.

Figure 4:
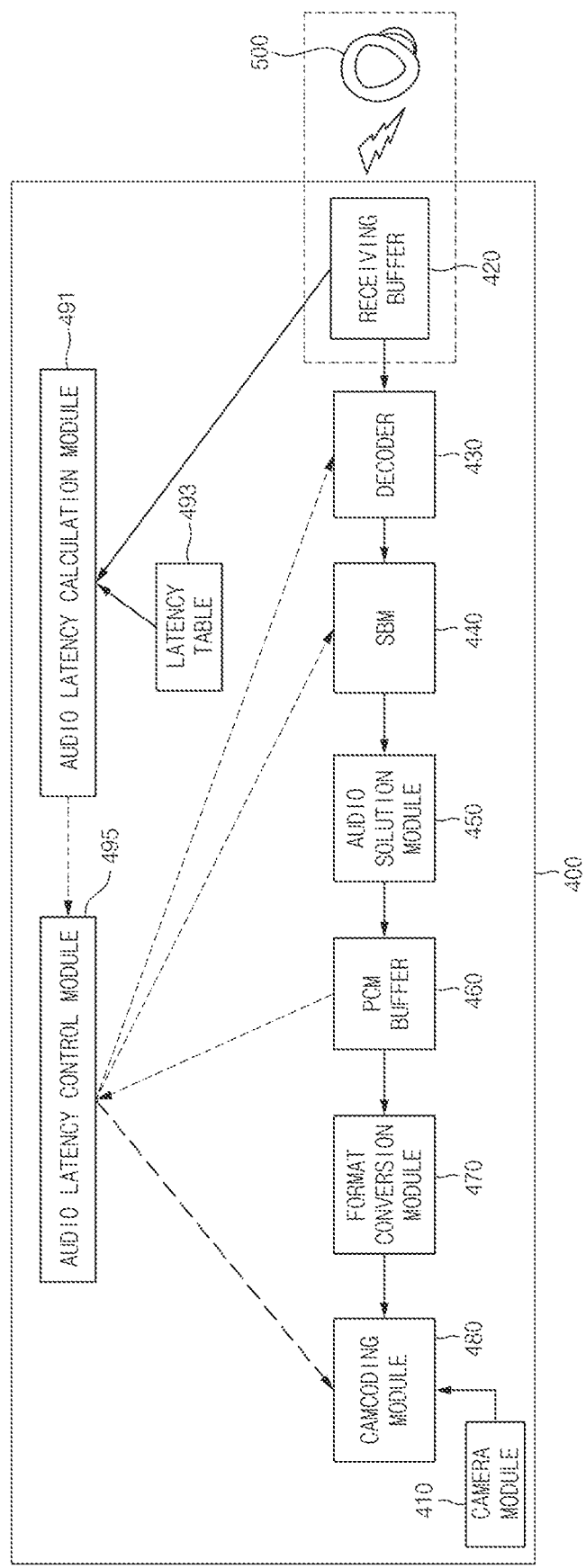
FIG. 4 is a diagram describing an example operation of an example electronic device according to various embodiments.

FIG. 4 is a diagram describing an example operation of an example electronic device according to various embodiments.

According to an embodiment, an electronic device 400 (e.g., a portable terminal) (e.g., the electronic device 101 of FIG. 1 or the electronic device 200 of FIG. 2) may include a camera module 410 (e.g., the camera 210 of FIG. 2), a receiving buffer 420, a decoder 430, a seamless buffer management (SBM) module 440, an audio solution module 450, a PCM (pulse code modulation) buffer 460, a format conversion module 470, a camcording module 480, an audio latency calculation module 491, a latency table 493, and an audio latency control module 495.

According to an embodiment, the camera module 410 may acquire image data. For example, the camera module 410 may generate image data by capturing the exterior of the electronic device 400. According to an embodiment, a capturing operation (e.g., an operation of generating image data by capturing the outside) of the camera module 410 may be performed simultaneously with a recording operation (e.g., an operation of generating the audio data based on sound received through a microphone) by an external electronic device 500 (e.g., wireless earphones, a wireless headset, or a wearable device) (e.g., the electronic devices 102 and 104 of FIG. 1 or the electronic device 300 of FIG. 3). For example, while the external electronic device 500 records sound, the camera module 410 may capture an image corresponding to the sound recorded by the external electronic device 500.

According to an embodiment, the receiving buffer 420 may at least temporarily store the audio data and/or information on the first audio latency received from the external electronic device 500. According to an embodiment, the audio data may, for example, include data encoded by the external electronic device 500. According to an embodiment, the receiving buffer 420 may at least temporarily store audio packets including the audio data and information on the first audio latency received from the external electronic device 500.

According to an embodiment, the decoder 430 may decode the audio data stored in the receiving buffer 420. For example, the decoder 430 may decode encoded audio data and may convert the decoded data into audio data (hereinafter, the term 'audio PCM' is used interchangeably) in a PCM (pulse code modulation) format.

According to an embodiment, the SBM module 440 may adjust the playback rate of the audio data (e.g., the audio PCM) based on control information received from the audio latency control module 495. For example, the SBM module 440 may adjust the playback rate of the audio data within a specified range compared to an original reference rate such that a user may not be aware that the playback rate of the audio data is changed.

According to an embodiment, the SBM module 440 may adjust the playback rate of the audio data by adjusting the sampling rate of the audio data (e.g., the audio PCM). For example, the SBM module 440 may increase the playback rate of the audio data by increasing the sampling rate of the audio data (e.g., the audio PCM). In this case, the length of the audio PCM output by the SBM module 440 may be shortened, and the amount of the audio PCM stored in the PCM buffer 460 may be reduced, thereby emptying the PCM buffer 460. As another example, the SBM module 440 may reduce the playback rate of the audio data by reducing the sampling rate of the audio data (e.g., the audio PCM). In this case, the length of the audio PCM output by the SBM module 440 may become longer, and the amount of the audio PCM stored in the PCM buffer 460 may increase, thereby filling the PCM buffer 460.

According to an embodiment, the audio solution module 450 may perform processing to improve a quality of the audio data. For example, the audio solution module 450 may perform a noise reduction (NR) operation on the audio data, a correction of the gain and/or tone of the audio data, or an addition of an effect to the audio data. According to various embodiments, the audio solution module 450 or the operation(s) of the audio solution module 450 may be omitted.

According to an embodiment, the PCM (pulse code modulation) buffer 460 may at least temporarily store the audio data (e.g., the audio PCM) output from the SBM module 440.

According to an embodiment, the format conversion module 470 may convert a format of the audio data into a format corresponding to the image data. For example, when the image data (or the image content to be created) is in an mp4 format, the format conversion module 470 may convert a format of the audio data into an m4a format corresponding to the mp4 format.

According to an embodiment, the camcording module 480 may generate the image content including the image data and the audio data. According to an embodiment, the camcording module 480 (e.g., a camcording application) may generate the image content by linking and including the image data received from the camera module 410 and the audio data received and processed from the external electronic device 500 in one file format. According to an embodiment, the camcording module 480 may at least temporarily store the generated image content in the memory of the electronic device.

According to an embodiment, the audio latency calculation module 491 may determine a total audio latency (e.g., the third audio latency) based on information on the audio latency (e.g., the first audio latency) related to the external electronic device 500 received from the external electronic device 500 and the audio latency (e.g., the second audio latency) related to the electronic device 400. For example, the audio latency related to the external electronic device 500 may represent a time taken from a time when the external electronic device 500 receives the external sound through a microphone of the external electronic device 500 to a time when the external electronic device 500 transmits the audio data generated by recording the external sound to the electronic device 400 (or a time just before transmission to the electronic device). For example, the audio latency (e.g., the second audio latency) related to the electronic device 400 may include a time required to process the audio data output from the receiving buffer according to at least one of a time taken for audio data stored in the receiving buffer and received from the external electronic device 500 to be output from the receiving buffer depending on the state of the receiving buffer of the electronic device 400, the performance of the electronic device 400, or the process of processing the audio data.

According to an embodiment, the audio latency calculation module 491 may determine the total audio latency (e.g., the third audio latency) by adding the audio latency (e.g., the first audio latency) related to the external electronic device 500 and the audio latency (e.g., the second audio latency) related to the electronic device 400.

According to an embodiment, the latency table 493 may be information stored in a table on a time (e.g., the audio latency internal to the electronic device 400) required to process the audio data output from the receiving buffer depending on the performance of the electronic device 400 and/or the process by which the electronic device 400 processes the audio data. For example, the audio latency internal to the electronic device 400 may generally have a fixed value depending on the performance of the electronic device 400 and/or the process (e.g., steps or operations of processing the audio data) by which the electronic device 400 processes the audio data. For example, the latency table 493 may include information on the audio latency with a fixed value depending on the performance of the electronic device 400 and/or the process (e.g., steps or operations of processing the audio data) by which the electronic device 400 processes the audio data. For example, the latency table 493 may be stored in a memory (not illustrated) of the electronic device 400.

According to an embodiment, the audio latency control module 495 may receive information on the total audio latency (e.g., the third audio latency) determined by the audio latency calculation module 491. According to an embodiment, the audio latency control module 495 may include information on a preset initial audio latency, or may read information on a preset initial audio latency from the memory of the electronic device 400. According to an embodiment, the initial audio latency may have a trade-off relationship with the degree of sound interruption within the image content, and may be determined according to an initial value set as a reference level of the receiving buffer 420. According to an embodiment, the initial audio latency may be preset based on a fixed audio latency (e.g., a time required for the electronic device 400 and the external electronic device 500 to process the audio data regardless of the communication environment), excluding a variable audio latency (e.g., a time required for the external electronic device 500 to transmit the audio data depending on the communication environment) required by the external electronic device 500.

According to an embodiment, the audio latency control module 495 may transmit control information for controlling the audio latency to the SBM module 440 based on the difference between the initial audio latency and the total audio latency (e.g., the third audio latency). According to an embodiment, the control information may include information related to the playback rate (e.g., increasing, decreasing, or maintaining the playback rate) of the audio data for a control by the SBM module 440, a time (e.g., an operation duration of the SBM module 440) when the SBM module 440 controls the audio data, and/or information directing an activation or a deactivation of the SBM module 440.

According to an embodiment, the audio latency control module 495 may continuously monitor the PCM buffer 460 and may control a decoding period of the decoder 430 based on the result obtained by comparing the amount of audio data (e.g., the audio PCM) stored in the PCM buffer 460 with a preset threshold (e.g., an upper threshold or a lower threshold). For example, when the SBM module 440 plays the audio data (e.g., the audio PCM) at a high speed, the length of the audio PCM output from the SBM module 440 may be shortened, and the amount of the audio PCM stored in the PCM buffer 460 may be reduced, thereby emptying the PCM buffer 460. For example, when the amount of the audio data (e.g., the audio PCM) stored in the PCM buffer 460 becomes below the lower threshold, the audio latency control module 495 may control the decoding speed of the decoder 430 to become faster such that the audio data may be retrieved from the receiving buffer 420 at a faster rate (a faster period). In this case, as the receiving buffer 420 outputs the stored audio data more quickly, the receiving buffer 420 may be emptied more quickly, thereby shortening the overall audio latency (e.g., the second audio latency and/or the third audio latency). As another example, when the SBM module 440 plays the audio data (e.g., the audio PCM) at a slow speed, the length of the audio PCM output from the SBM module 440 may be long, and the amount of the audio PCM stored in the PCM buffer 460 may increase, thereby filling the PCM buffer 460. For example, when the amount of audio data (e.g., the audio PCM) stored in PCM buffer 460 exceeds the upper threshold, the audio latency control module 495 may control the decoding speed of the decoder 430 to be lowered such that audio data may be retrieved from the receiving buffer 420 at a slower rate (a faster period). In this case, the receiving buffer 420 may output the stored audio data more slowly, thereby increasing the overall audio latency (e.g., the second audio latency and/or the third audio latency). According to an embodiment, the audio latency control module 495 controls the SBM module 440 and the decoding speed of the decoder 430, such that the total audio latency (e.g., the third audio latency) follows the preset initial audio latency. According to an embodiment, as the total audio latency (e.g., third audio latency) is adjusted to correspond to the preset initial audio latency, synchronization between the video data and the audio data may be maintained without the image data adjusted according to the initial audio latency and the audio data being (or becoming) out of sync.

According to various embodiments, at least some (e.g., the audio solution module 450) of the components of the electronic device 400 illustrated in FIG. 4 may be omitted, or at least one component may be added to the components of the electronic device 400. According to an embodiment, at least some (e.g., the decoder 430, the SBM module 440, the audio solution module 450, the format conversion module 470, and/or the camcording module 480) may be implemented with at least one processor (e.g., the processor 120 of FIG. 1 or the processor 260 of FIG. 2) of the electronic device, or an operation of at least some (e.g., the decoder 430, the SBM module 440, the audio solution module 450, the format conversion module 470, and/or the camcording module 480) of the components of FIG. 4 may be performed by at least one processor included in the electronic device.

Figure 5:
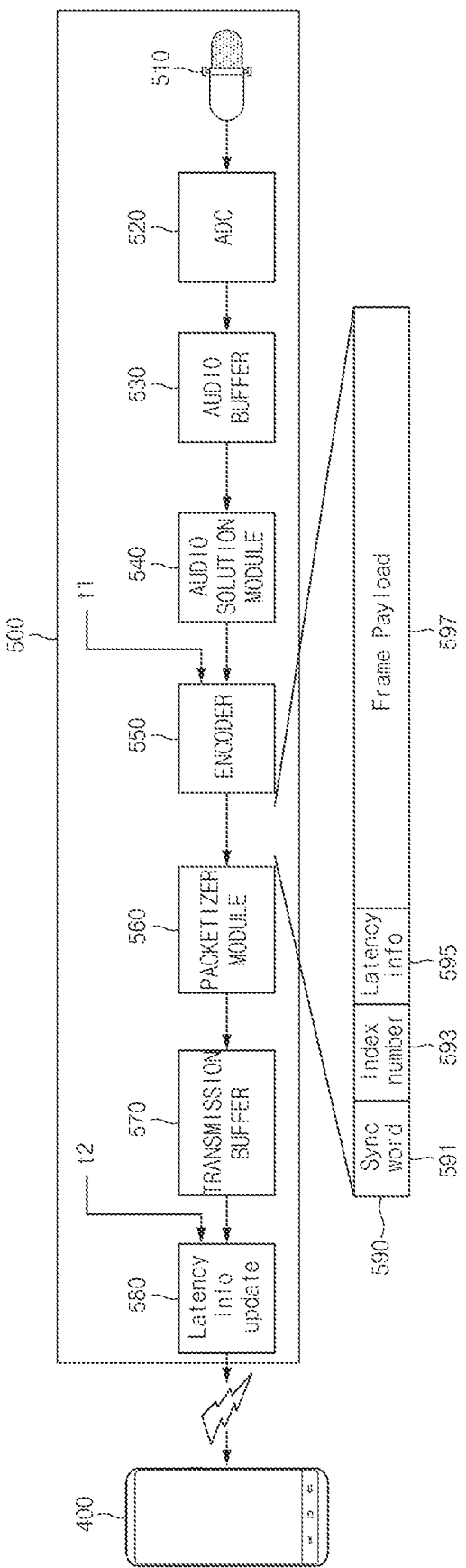
FIG. 5 is a diagram describing an example operation of an example electronic device according to various embodiments.

FIG. 5 is a diagram describing an example operation of an example electronic device according to various embodiments.

According to an embodiment, an electronic device 500 (e.g., the electronic devices 102 and 104 of FIG. 1 or the electronic device 300 of FIG. 3) may include a microphone 510 (e.g., the microphone 330 of FIG. 3), an ADC (analog-to-digital converter) 520, an audio buffer 530, an audio solution module 540, an encoder 550, a packetizer module 560, a transmission buffer 570, and a latency information update module 580.

According to an embodiment, the microphone 510 may receive sound from outside the electronic device 500. For example, sound received by the microphone 510 may be an analog audio signal. According to an embodiment, the recording operation of the microphone 510 may be performed simultaneously with the image capturing operation of an external electronic device 400 (e.g., a portable terminal) (e.g., the electronic device 101 of FIG. 1, the electronic device 200 of FIG. 2, or the electronic device 400 of FIG. 4). For example, while the external electronic device 400 acquires image data using the camera 410 of the external electronic device 400, the microphone 510 may receive sound corresponding to the image data.

According to an embodiment, the ADC 520 may convert an analog audio signal received through the microphone 510 into digital audio data.

According to an embodiment, the audio buffer 530 may at least temporarily store the audio data converted by the ADC 520.

According to an embodiment, the audio solution module 540 may perform processing to improve the quality of audio data. For example, the audio solution module 540 may perform a noise reduction (NR) operation on the audio data, a correction of the gain and/or tone of the audio data, or an addition of an effect to the audio data. According to an embodiment, the audio solution module 540 or the operation of the audio solution module 540 may be omitted.

According to an embodiment, the encoder 550 may encode the audio data. According to an embodiment, the electronic device 500 may record time information t1 at a time when audio data is input to the encoder 550. For example, the time from recording sound through the microphone 510 to the time information t1 may be a fixed latency before performing an operation (e.g., a packetization operation and a transmission operation) for the external electronic device 400 to transmit the audio data to the electronic device 500.

According to an embodiment, the packetizer module 560 may packetize encoded audio data. For example, the packetizer module 560 may packetize the audio data to correspond to a designated communication format for transmitting the audio data. For example, when the electronic device 500 transmits the audio data to the external electronic device 400 through Bluetooth communication, the packetizer module 560 may packetize the audio data into an audio packet 590 corresponding to Bluetooth communication. For example, the packetizer module 560 may generate an audio packet including the audio data.

According to an embodiment, the audio packet 590 may include a sync word 591, an index number 593, latency information 595, and a frame payload 597. According to an embodiment, the sync word 591 may include data (e.g., synchronization information for communication connection of devices) corresponding to a designated communication method. According to an embodiment, the index number 593 may include index information of the audio packet 590. According to an embodiment, the latency information 595 may include information on the latency required to process the audio data in the electronic device 500. For example, a partial area (e.g., the latency information 595) of the audio packet 590 output from the packetizer module 560 may include information on a fixed latency (e.g., from the time when the microphone 510 receives external sound to the time information t1). For example, information stored in a partial area (e.g., the latency information 595) of the audio packet 590 may be updated by the latency information update module 580. For example, the information stored in the latency information 595 may be updated by adding a fixed latency (e.g., the time from when the microphone 510 receives an external sound to the time information t1) and a variable latency (e.g., t2−t1) by the latency information update module 580 so as to have information on the total latency spent in the electronic device 500. According to an embodiment, the frame payload 597 may store the audio data.

According to an embodiment, the transmission buffer 570 may store the audio packet 590 at least temporarily. For example, the transmission buffer 570 may buffer the audio packet 590 before transmitting the audio packet 590 to the external electronic device 400. According to an embodiment, the time for which the transmission buffer 570 stores the audio packet 590 may vary depending on the communication environment (communication situation). For example, when the communication environment is poor, transmission of the audio packet 590 may be delayed and the audio packet 590 may be stored in the transmission buffer 570 for a longer time. In contrast, when the communication environment is good, the audio packet 590 may be stored in the transmission buffer 570 for a relatively short time.

According to an embodiment, the latency information update module 580 may record the time t2 at which the audio packet 590 is transmitted to the external electronic device 400. For example, the time from t1 to t2 may be a latency that varies depending on the communication environment (communication state). For example, the time (e.g., the first audio latency) required for the electronic device 500 to transmit the audio packet 590 to the external electronic device 400 may be the time from when an external sound corresponding to the audio data is received through the microphone 510 to the time t2. For example, the time required for the electronic device 500 to transmit the audio packet 590 to the external electronic device 400 may include a fixed latency from the time when sound is received through the microphone 510 to the time t1 and a variable latency from the time t1 to the time t2.

According to an embodiment, the latency information update module 580 may transmit information on a latency (e.g., the first audio latency) that may be changed in real time based on information of the time t1 and information of the time t2 through the audio packet 590 to the external electronic device 400 in real time, periodically, and/or based on a request from the external electronic device 400. For example, the latency information update module 580 may contain information on a latency (e.g., first audio latency) in a partial area (e.g., the latency information 595) of the audio packet 590 so as to be transmitted to the external electronic device 400. For example, a partial area (e.g., the latency information 595) of the audio packet 590 output from the packetizer module 560 may include information of a fixed latency (e.g., the time from recording through microphone 510 to the time t1). For example, the latency information update module 580 may update information stored in a partial area (e.g., the latency information 595) of the audio packet 590 based on information at the time t2. For example, the latency information update module 580 may update and store information on the total latency (e.g., the first audio latency) taken from the time when the electronic device 500 receives an external sound corresponding to audio data to the time when the electronic device 500 transmits the audio packet 590 to the external electronic device 400 in a partial area (e.g., the latency information 595) of the audio packet 590. For example, the latency information update module 580 may update a value stored in a partial area (e.g., the latency information 595) of the audio packet 590 by adding the value of a fixed latency already stored in a partial area (the latency information 595) of the audio packet 590 output from the transmission buffer 570 and a difference value between the time t2 immediately before transmitting the audio packet 590 to the external electronic device 400 and the time t1 when the audio data is input to the encoder 550.

The electronic device 500 according to an embodiment of the disclosure may identify a total latency (e.g., the first latency) related to the electronic device 500 in real time from the time of receiving the sound corresponding to the audio data to the time of transmitting the audio packet 590 to the external electronic device 400, and may transmit information on the total latency (e.g., the first audio latency) to the external electronic device 400. For example, the electronic device 500 according to an embodiment of the disclosure may check in real time information on the audio latency, which may vary depending on the communication environment, and may provide information on the audio latency to maintain synchronization between the audio data and the image data to the external electronic device 400 in real time, periodically, and/or based on a request from the external electronic device 400.

According to various embodiments, at least some (e.g., the audio solution module 540) of the components of the electronic device 500 illustrated in FIG. 5 may be omitted, or at least one component may be added to the components of the electronic device 500. According to an embodiment, at least some (e.g., the ADC 520, the audio solution module 540, the encoder 550, the packetizer module 560, and/or the latency information update module 580) of the components of FIG. 5 may be implemented with at least one processor (e.g., the processor 340 of FIG. 3) of the electronic device, or an operation of at least some (e.g., the ADC 520, the audio solution module 540, the encoder 550, the packetizer module 560, and/or the latency information update module 580) of the components may be performed by at least one processor included in the electronic device 500.

According to various embodiments of the disclosure, an electronic device includes a camera, a communication circuit, a memory, and at least one processor operatively coupled to the camera, the communication circuit, and the memory, and the memory stores instructions that, when executed by the at least one processor, cause the electronic device to obtain image data using the camera, to receive audio data recorded by an external electronic device and information on first audio latency from the external electronic device with which communication is established through the communication circuit; determine a second audio latency required to process the received audio data by the at least one processor; determine a third audio latency based on the first audio latency and the second audio latency; determine a difference between a preset initial audio latency and the third audio latency; synchronize the audio data with the image data based at least in part on the difference; and generate image content including the image data and the audio data based at least in part on a synchronization result.

According to various embodiments, the first audio latency may, for example, indicate a time taken from a time when the external electronic device receives an external sound corresponding to the audio data through a microphone of the external electronic device to a time when the audio data is transmitted to the electronic device.

According to various embodiments, the memory may include a receiving buffer that at least temporarily stores the received audio data, and the second audio latency may, for example, include a time required for the audio data stored in the receiving buffer to be output from the receiving buffer depending on a state of the receiving buffer, and a time required to process the audio data output from the receiving buffer depending on at least one of a performance of the electronic device or a process for processing the audio data.

According to various embodiments, the state of the receiving buffer may be determined based on at least some of a communication environment and a communication state of the electronic device and the external electronic device.

According to various embodiments, the instructions, when executed, may cause the electronic device to adjust a method of processing the audio data, to adjust the third audio latency to correspond to the initial audio latency.

According to various embodiments, the memory may include a receiving buffer that stores the received audio data, and the electronic device may further include a decoder that outputs the audio data stored in the receiving buffer at a specified rate. According to various embodiments, the instructions, when executed, may cause the electronic device to adjust, based on the difference, at least one of a reference level of the receiving buffer, a time to store the audio data in the receiving buffer, or a rate of outputting the audio data stored in the receiving buffer through the decoder, to adjust the third audio latency to correspond to the initial audio latency.

According to various embodiments, the instructions, when executed, may cause the electronic device to, when the rate for outputting the audio data is adjusted, adjust the rate of outputting the audio data for a specified time within a specified range with respect to a reference rate.

According to various embodiments, the memory may include a receiving buffer that stores the received audio data, and the electronic device may include a decoder that outputs the audio data stored in the receiving buffer at a specified rate. According to various embodiments, the instructions, when executed, may cause the electronic device to adjust a sampling rate of the audio data output from the receiving buffer based on the difference, to adjust the third audio latency to correspond to the initial audio latency.

According to various embodiments, the instructions, when executed, may cause the electronic device to receive information on the audio data and the first audio latency through a data packet in a designated communication format.

According to various embodiments, the instructions, when executed, may cause the electronic device to set the initial audio latency such that a time of obtaining the image data and a time of recording the audio data related to the image data correspond to each other.

According to various embodiments, the instructions, when executed, may cause the electronic device to convert the audio data into a format corresponding to the image data, and to generate the image content including the audio data in the converted format and the image data based at least in part on the synchronization result.

Figure 6:
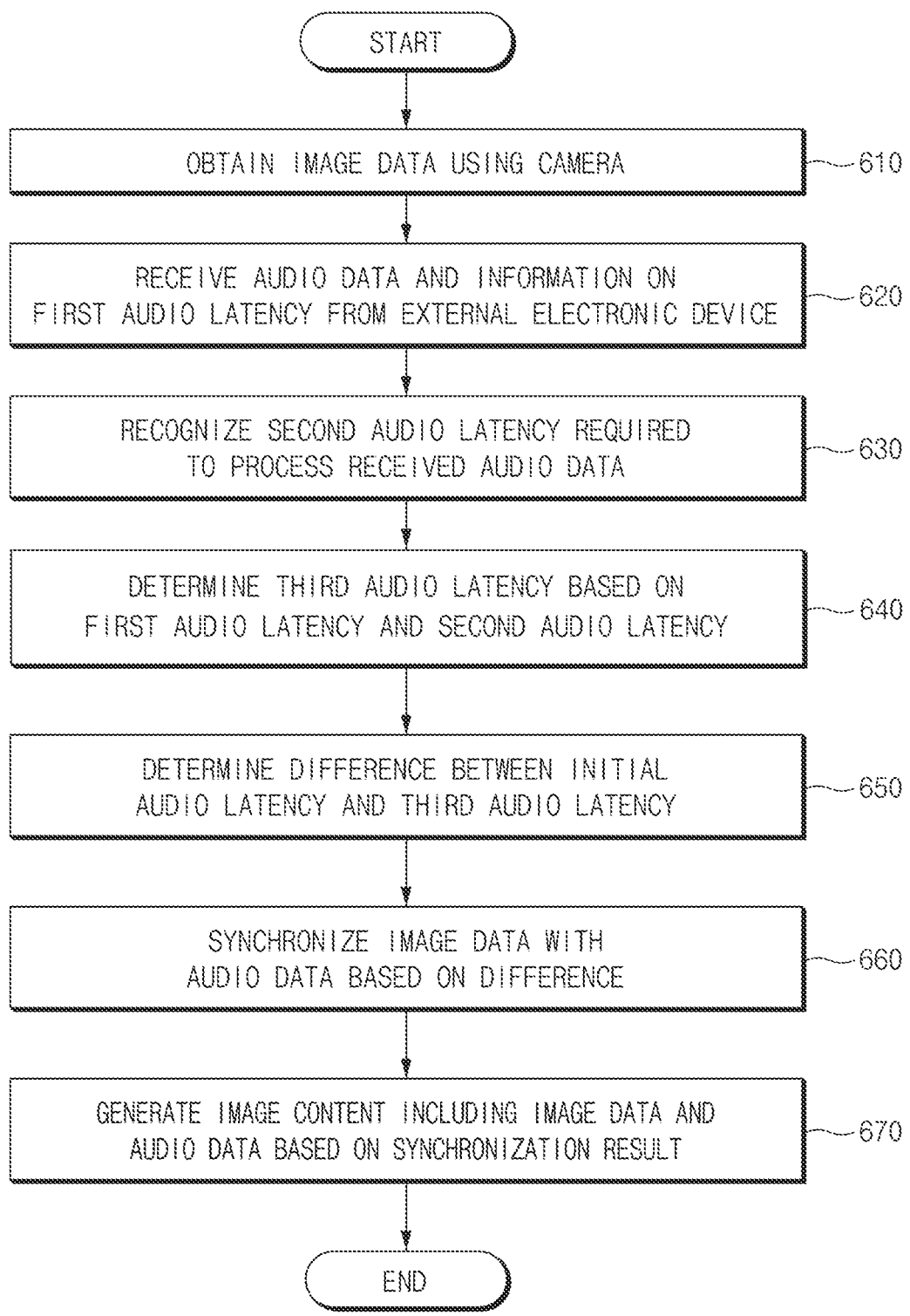
FIG. 6 is a flowchart of an example method of operating an example electronic device according to various embodiments.

FIG. 6 is a flowchart of an example method of operating an example electronic device according to various embodiments. According to an embodiment, a method of operating the electronic device of FIG. 6 may be performed by the processor (the processor 120 of FIG. 1 or the processor 260 of FIG. 2) of the electronic device (e.g., the electronic device 101 of FIG. 1, the electronic device 200 of FIG. 2, or the electronic device 400 of FIG. 4).

According to an embodiment, in operation 610, the electronic device may obtain image data using a camera. For example, the electronic device may generate the image data by capturing the outside using a camera.

According to an embodiment, in operation 620, the electronic device may receive audio data and information on first audio latency from the external electronic device (e.g., the electronic devices 102 and 104 of FIG. 1, the electronic device 300 of FIG. 3, or the electronic device 500 of FIG. 5). For example, the electronic device may receive the audio data and the information on the first audio latency through a data packet in a designated communication format (e.g., a Bluetooth format or a BLE format). For example, the electronic device may receive an audio packet including the audio data and the information on the first audio latency from an external electronic device. According to an embodiment, the first audio latency may, for example, indicate a time taken from a time when the external electronic device receives an external sound corresponding to the audio data through the microphone to a time (e.g., immediately before the external electronic device transmits the audio data to the electronic device) when the external electronic device transmits the audio data to the electronic device. For example, the first audio latency may include a fixed latency required for an external electronic device to process the audio data, and a variable latency required for the external electronic device to packetize the audio data and to transmit the packetized audio data to the electronic device. For example, the variable latency may vary depending on the communication situation or communication environment. For example, when the communication environment is relatively good, the variable latency may relatively decrease, and when the communication environment is relatively poor, the variable latency may relatively increase.

According to an embodiment, in operation 630, the electronic device may determine the second audio latency required to process the received audio data. For example, the second audio latency may include the time required for the audio data stored in the receiving buffer to be output depending on the state of the receiving buffer of the electronic device that at least temporarily stores the received audio data, and the time (e.g., the audio latency internal to the electronic device) required to process the audio data output from the receiving buffer according to at least one of the performance of the electronic device or the process processing the audio data. According to an embodiment, the state of the receiving buffer may be determined based on at least some of the communication environment and communication state of the electronic device and the external electronic device.

For example, the internal audio latency of the electronic device may be determined differently depending on the performance of the electronic device. For example, as the electronic devices perform better, the time taken to process the same audio data may become shorter. For example, the time taken for the electronic device to process the audio data may be determined differently depending on the operation or step that is performed by the electronic device processing the audio data. For example, as the number of operations the electronic device performs to process the audio data increases or the steps for processing the audio data become more complex, the time required to process the audio data may increase. For example, as the electronic device performs additional processing operations (e.g., a noise reduction (NR), a gain correction, a tone correction and/or an effect addition) to improve the sound quality of the audio data, the time it takes for the electronic device to process the audio data may increase. For example, when the performance of the electronic device and the process by which the electronic device processes audio data are predetermined, the time it takes for the electronic device to process the audio data may be determined in advance. For example, the second audio latency may include a latency that varies depending on the communication environment or communication state at the receiving buffer stage and a latency that is fixed depending on the performance of the electronic device and the process by which the electronic device processes the audio data.

According to an embodiment, in operation 640, the electronic device may determine the third audio latency based on the first audio latency and the second audio latency. For example, the electronic device may determine the third audio latency by adding the first audio latency and the second audio latency.

According to an embodiment, in operation 650, the electronic device may determine a difference between the initial audio latency and the third audio latency. According to an embodiment, the initial audio latency may be a reference time for holding image data and synchronizing the audio data with the image data. For example, the electronic device may set the initial latency such that the time when the image data is obtained corresponds to the time when the external electronic device records the audio data related to the image data (e.g., the time when the external electronic device receives sound corresponding to the audio data through a microphone). For example, when the electronic device generates image content including image data and audio data, the electronic device may receive the audio data acquired by the external electronic device from the external electronic device through wireless communication. In this case, the acquisition time of the audio data received by the electronic device from an external electronic device may be delayed by a certain time compared to the image data acquired (generated) by the electronic device itself. Accordingly, the electronic device may preset the initial latency for synchronizing the image data with the audio data. For example, the electronic device may set the initial latency by setting the initial buffering degree in consideration of synchronization accuracy of image data and audio data and requirements for preventing sound interruption. For example, the initial latency may have a trade-off relationship with a sound interruption of audio data. For example, as the initial latency becomes longer, there is extra time to synchronize the image data with the audio data, which may reduce the degree of sound interruption during synchronization. For example, the electronic device may set the corresponding initial latency by setting a reference level (e.g., the capacity of audio data to be stored in the receiving buffer, and/or the time for storing audio data in the receiving buffer) of the receiving buffer. For example, when the reference level of the receiving buffer is set to 200 ms, because the currently received data is processed after outputting the data (e.g., the audio data) for 200 ms previously stored in the receiving buffer, a delay of 200 ms may occur. As in the above description, when the reference level of the receiving buffer is set to 400 ms, because the currently received data is processed after outputting the data (e.g., the audio data) for 400 ms previously stored in the receiving buffer, a delay of 400 ms may occur. According to an embodiment, the third audio latency may vary depending on a variable communication environment, and the difference from the initial latency may also vary accordingly. For example, the initial latency may be a preset fixed time, but because the third audio latency is a variable time, the degree of difference between the initial latency and the third audio latency may vary depending on changes in the communication environment.

According to an embodiment, in operation 660, the electronic device may synchronize the image data with the audio data based on the difference. For example, the synchronization between the image data and the audio data may refer, for example, to the operation of controlling a process that processes the audio data to adjust the third audio latency to correspond to the initial audio latency such that the audio data and the image data adjusted according to the initial latency are not out of sync. According to an embodiment, the electronic device may adjust the method of processing the audio data such that the third audio latency follows the initial audio latency. For example, the electronic device may adjust the method of processing the audio data to adjust the third audio latency to correspond to the initial audio latency. For example, the electronic device may perform at least one of an operation of adjusting the reference level of the receiving buffer for storing received audio data, an operation of adjusting a time for storing audio data in the receiving buffer, or an operation of adjusting a rate of outputting the audio data stored in the receiving buffer through a decoder. For example, the electronic device may adjust the rate of outputting the audio data stored in the receiving buffer for a specified time within a specified range with respect to the reference rate. For example, the electronic device may adjust the level of the receiving buffer from a preset reference level to a different level based on the difference between the third audio latency and the initial audio latency. According to an embodiment, the electronic device may adjust the sampling rate of the audio data output from the receiving buffer that stores the received audio data. For example, the electronic device may change the rate of processing the audio data (the time required to process the audio data) through the above-mentioned adjustment operations, thereby allowing the third audio latency to follow the preset initial latency. For example, the electronic device may adjust the processing method of the audio data such that the third audio latency (e.g., the real-time total audio latency) is maintained at a preset initial audio latency. According to an embodiment, the electronic device may synchronize the image data with the audio data based on the third audio latency. According to an embodiment, because the third audio latency may be adjusted to correspond to the preset initial audio latency (e.g., maintained at the initial audio latency), the electronic device may prevent (or reduce the possibility of) the image data and the audio data from being out of sync.

According to an embodiment, in operation 670, the electronic device may generate image content including the image data and the audio data based at least in part on the synchronization result. For example, the electronic device may generate the image content by linking and including the image data and the audio data in one file format based on the synchronization result through the camcording module (or the camcording application). For example, the image content may include the image data, the audio data, and data related to synchronization of the image data and the audio data. For example, the electronic device may generate the image content by linking and including the image data, the audio data, data related to synchronization of the image data and the audio data in one file format. For example, the image content may refer to content that integrates the image data and the audio data. According to an embodiment, the electronic device may store the image content in a memory of the electronic device or an external server.

According to an embodiment, the electronic device repeatedly performs operations 610 to 670 after starting recording (e.g., receiving a user input to start recording) until recording ends (e.g., receiving a user input to end recording). For example, the electronic device may repeatedly perform operations 610 to 670 in real time during recording.

According to an embodiment, the electronic device may prevent (or reduce the possibility of) the audio data and the image data which is adjusted based on the initial audio latency, from being out of sync, and may generate high-quality image content by determining the real-time audio latency (e.g., the third audio latency) based on the audio latency (e.g., the first audio latency) related to the external electronic device and the audio latency (e.g., the second audio latency) related to the electronic device and by adjusting the processing method of the audio data such that the real-time audio latency follows the preset initial audio latency.

Figure 7:
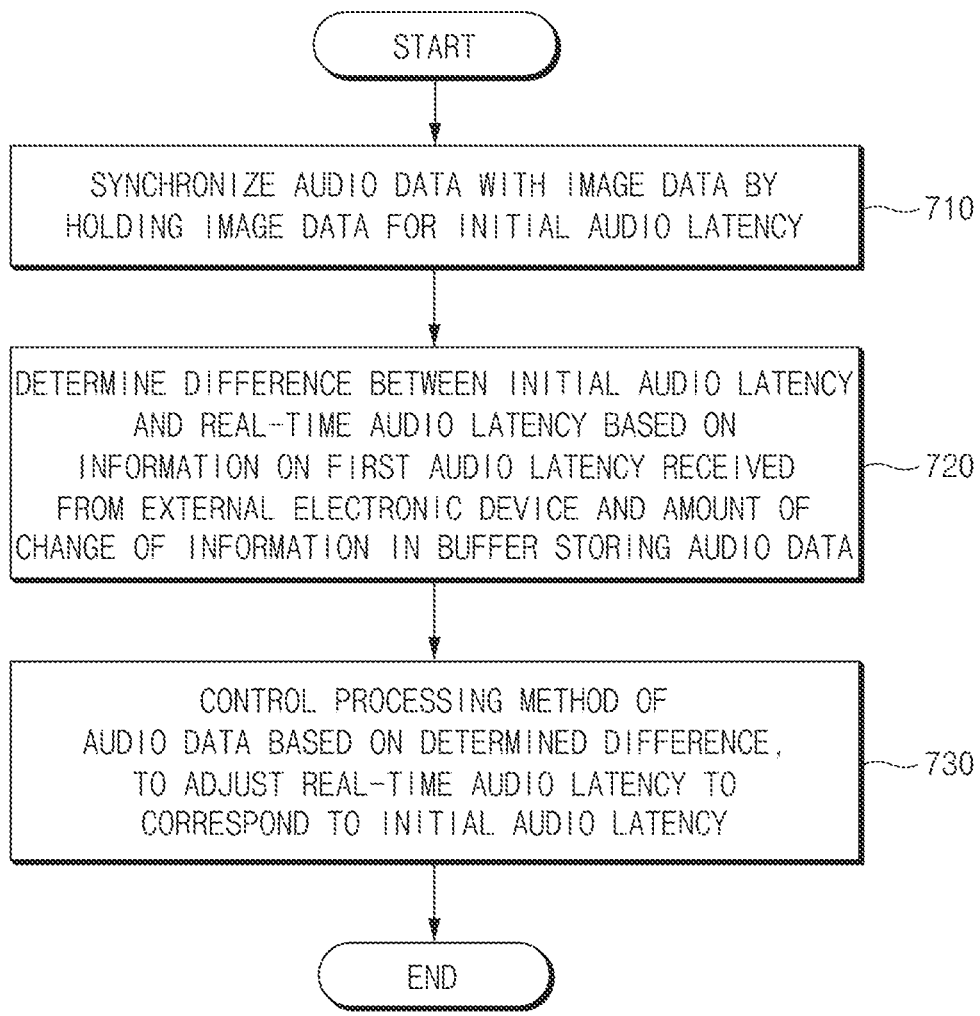
FIG. 7 is a flowchart of an example method of operating an example electronic device according to various embodiments.

FIG. 7 is a flowchart of an example method of operating an example electronic device according to various embodiments. According to an embodiment, a method of operating the electronic device of FIG. 6 may be performed by the processor (the processor 120 of FIG. 1 or the processor 260 of FIG. 2) of the electronic device (e.g., the electronic device 101 of FIG. 1, the electronic device 200 of FIG. 2, or the electronic device 400 of FIG. 4). Hereinafter, descriptions that are duplicated or similar to those of FIG. 6 will not be repeated or only briefly described to avoid redundancy.

According to an embodiment, in operation 710, the electronic device may synchronize the audio data with the image data by holding the image data for the initial audio latency. According to an embodiment, the electronic device may set the initial latency such that a time at which the image data is acquired corresponds to a time (e.g., a time when the external electronic device receives sound corresponding to the audio data through a microphone) when the external electronic device records the audio data related to the image data. For example, the initial latency may have a trade-off relationship with a sound interruption of audio data. For example, the electronic device may set the initial latency by setting the initial buffering degree of the receiving buffer in consideration of synchronization accuracy of image data and audio data and requirements for preventing sound interruption. For example, the electronic device may set the corresponding initial latency by setting a reference level (e.g., the capacity of audio data to be stored in the receiving buffer, and/or the time for storing audio data in the receiving buffer) of the receiving buffer. For example, when the processing rate (e.g., the playback rate) of the audio data becomes faster than the preset initial audio latency, the corresponding audio data may be played faster than the image data, causing the image data and the audio data to be (or become) out of sync. In addition, when the processing rate (e.g., the playback rate) of the audio data is slower than the preset initial audio latency, the corresponding audio data may be played later than the image data, causing the image data and the audio data to be (or become) out of sync.

According to an embodiment, in operation 720, the electronic device may determine the difference between the initial audio latency and the current real-time audio latency (e.g., third audio latency) based on information on the first audio latency received from the external electronic device (e.g., the electronic devices 102 and 104 of FIG. 1, the electronic device 300 of FIG. 3, or the electronic device 500 of FIG. 5) and the amount of change of information in buffer storing the audio data.

For example, the real-time audio latency may include, for example, the audio latency (e.g., the first audio latency) related to the external electronic device from a time when the external electronic device receives sound through a microphone to a time when the audio data generated based on the received sound is processed and transmitted to the electronic device, and the audio latency (e.g., the second audio latency) related to the electronic device. For example, the audio latency related to the external electronic device may include a fixed time it takes for the external electronic device to record an audio and to generate and process the audio data, and the time it takes to transmit the audio data, which may vary depending on the communication environment (communication situation) to the electronic device. For example, the audio latency related to the electronic device may include the time required for the audio data stored in the receiving buffer to be output depending on the state of the receiving buffer of the electronic device that at least temporarily stores the received audio data, and the time (e.g., the audio latency internal to the electronic device) required to process the audio data output from the receiving buffer according to at least one of the performance of the electronic device or the process processing the audio data.

According to an embodiment, in operation 730, the electronic device may control the processing method of the audio data based on the determined difference, to adjust the real-time audio latency to correspond to the initial audio latency. For example, based on the difference, the electronic device may adjust the processing method of the audio data such that the real-time audio latency follows the initial audio latency. For example, the electronic device may perform at least one of an operation of adjusting the reference level of the receiving buffer that stores the received audio data, an operation of adjusting the time for storing the audio data in the receiving buffer, an operation of adjusting the rate of outputting the audio data stored in the receiving buffer through a decoder, an operation of adjusting the rate of outputting the audio data stored in the receiving buffer for a specified time within a specified range with respect to the reference rate, an operation of adjusting the level of the receiving buffer from a preset reference level to a different value, or an operation of adjusting the sampling rate of the audio data output from the receiving buffer.

According to an embodiment, the electronic device controls the real-time audio latency to follow the initial audio latency, thereby maintaining the sync between the image data and the audio data in real time even in a variable communication environment, and synchronizing the image data with the audio data. According to an embodiment, the electronic device may generate image content including the image data and the audio data based at least in part on the synchronization result.

According to various embodiments of the disclosure, a method of operating an electronic device includes obtaining image data using a camera, receiving audio data recorded by an external electronic device and information on first audio latency from the external electronic device, determining a second audio latency required to process the received audio data by the electronic device, determining a third audio latency based on the first audio latency and the second audio latency, determining a difference between a preset initial audio latency and the third audio latency, synchronizing the audio data with the image data based at least in part on the difference, and generating image content including the image data and the audio data based at least in part on the synchronization result.

According to various embodiments, the first audio latency may, for example, indicate a time taken from a time when the external electronic device receives an external sound corresponding to the audio data through a microphone of the external electronic device to a time when the external electronic device transmits the audio data to the electronic device.

According to various embodiments, the second audio latency may include a time required for the audio data stored in the receiving buffer to be output depending on a state of the receiving buffer of the electronic device that at least temporarily stores the received audio data, and a time required to process the audio data output from the receiving buffer depending on at least one of a performance of the electronic device and a process for processing the audio data.

According to various embodiments, the state of the receiving buffer may be determined based on at least some of a communication environment and a communication state of the electronic device and the external electronic device.

According to various embodiments, the synchronizing may include adjusting a method of processing the audio data, to adjust the third audio latency to correspond to the initial audio latency.

According to various embodiments, the adjusting may include at least one of adjusting a reference level of a receiving buffer storing the received audio data, adjusting a time to store the audio data in the receiving buffer, and adjusting a rate of outputting the audio data stored in the receiving buffer through a decoder.

According to various embodiments, the adjusting of the rate may include adjusting a rate of outputting the audio data for a specified time within a specified range with respect to a reference rate.

According to various embodiments, the adjusting may include adjusting a sampling rate of the audio data output from a receiving buffer storing the received audio data.

According to various embodiments of the disclosure, in a non-transitory recording medium storing computer-readable instructions, the instructions, when executed by an electronic device, cause the electronic device to obtain image data using a camera, receive audio data recorded by an external electronic device and information on first audio latency from the external electronic device, determine a second audio latency required to process the received audio data by the electronic device, determine a third audio latency based on the first audio latency and the second audio latency, determine a difference between a preset initial audio latency and the third audio latency, synchronize the audio data with the image data based at least in part on the difference, and generate image content including the image data and the audio data based at least in part on the synchronization result.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, terms such as "1st" and "2nd" or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used herein, the term "module" may include a unit implemented in hardware, software, or firmware, or a combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, at least one processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" simply refers to the storage medium being a tangible device, and does not include a signal (e.g., an electromagnetic wave); but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities and some of multiple entities may be separately disposed on the other components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in the disclosure, image data obtained from an electronic device may be effectively synchronized with audio data recorded from an external device.

According to various embodiments disclosed in the disclosure, asynchronization that occurs due to passage of time or changes in environment may be prevented or reduced by maintaining the initial audio latency to synchronize image data and audio data.

According to various embodiments disclosed in the disclosure, synchronization of image data and audio data may be effectively maintained by controlling the final audio latency by applying the variable audio latency.

In addition to this, various effects identified directly or indirectly through this specification may be provided.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a camera;
    a communication circuit;
    memory; and
    at least one processor, comprising processing circuitry, operatively coupled to the camera, the communication circuit, and the memory, and
    wherein the memory stores instructions that, when executed by the at least one processor, cause the electronic device to:
      obtain image data using the camera;
      receive audio data recorded by an external electronic device and information on first audio latency from the external electronic device with which communication is established through the communication circuit;
      determine a second audio latency required to process the received audio data by the at least one processor;
      determine a third audio latency based on the first audio latency and the second audio latency;
      determine a difference between a preset initial audio latency and the third audio latency;
      synchronize the audio data with the image data based at least in part on the difference; and generate image content including the image data and the audio data based at least in part on the synchronization result.

2. The electronic device of claim 1, wherein the first audio latency indicates a time elapsing from a time when the external electronic device receives an external sound corresponding to the audio data through a microphone of the external electronic device to a time when the audio data is transmitted to the electronic device.

3. The electronic device of claim 1, wherein the memory includes a receiving buffer that at least temporarily stores the received audio data, and
wherein the second audio latency includes a time required for the audio data stored in the receiving buffer to be output from the receiving buffer depending on a state of the receiving buffer, and a time required to process the audio data output from the receiving buffer depending on at least one of a performance of the electronic device or a process for processing the audio data.

4. The electronic device of claim 3, wherein the state of the receiving buffer is determined based on at least some of a communication environment and a communication state of the electronic device and the external electronic device.

5. The electronic device of claim 1, wherein the instructions, when executed, cause the electronic device to:
adjust a method of processing the audio data, to adjust the third audio latency to correspond to the initial audio latency.

6. The electronic device of claim 1, wherein the memory includes a receiving buffer that stores the received audio data,
wherein the electronic device further includes a decoder that outputs the audio data stored in the receiving buffer at a specified rate, and
wherein the instructions, when executed, cause the electronic device to:
adjust, based on the difference, at least one of a reference level of the receiving buffer, a time to store the audio data in the receiving buffer, or a rate of outputting the audio data stored in the receiving buffer through the decoder, to adjust the third audio latency to correspond to the initial audio latency.

7. The electronic device of claim 6, wherein the instructions, when executed, cause the electronic device to:
when the rate for outputting the audio data is adjusted, adjust the rate of outputting the audio data for a specified time within a specified range with respect to a reference rate.

8. The electronic device of claim 1, wherein the memory includes a receiving buffer that stores the received audio data,
wherein the electronic device includes a decoder that outputs the audio data stored in the receiving buffer at a specified rate, and
wherein the instructions, when executed, cause the electronic device to:
adjust a sampling rate of the audio data output from the receiving buffer based on the difference, to adjust the third audio latency to correspond to the initial audio latency.

9. The electronic device of claim 1, wherein the instructions, when executed, cause the electronic device to:
receive information on the audio data and the first audio latency through a data packet in a designated communication format.

10. The electronic device of claim 1, wherein the instructions, when executed, cause the electronic device to:

set the initial audio latency such that a time of obtaining the image data and a time of recording the audio data related to the image data correspond to each other.

11. The electronic device of claim 1, wherein the instructions, when executed, cause the electronic device to:
convert the audio data into a format corresponding to the image data, and
generate the image content including the audio data in the converted format and the image data based at least in part on the synchronization result.

12. A method of operating an electronic device, the method comprising:
obtaining image data using a camera;
receiving audio data recorded by an external electronic device and information on first audio latency from the external electronic device;
determining a second audio latency required to process the received audio data by the electronic device;
determining a third audio latency based on the first audio latency and the second audio latency;
determining a difference between a preset initial audio latency and the third audio latency;
synchronizing the audio data with the image data based at least in part on the difference; and
generating image content including the image data and the audio data based at least in part on the synchronization result.

13. The method of claim 12, wherein the first audio latency indicates a time elapsing from a time when the external electronic device receives an external sound corresponding to the audio data through a microphone of the external electronic device to a time when the external electronic device transmits the audio data to the electronic device.

14. The method of claim 12, wherein the second audio latency includes a time required for the audio data stored in a receiving buffer that at least temporarily stores the received audio data to be output depending on a state of the receiving buffer, and a time required to process the audio data output from the receiving buffer depending on at least one of a performance of the electronic device or a process for processing the audio data.

15. The method of claim 14, wherein the state of the receiving buffer is determined based on at least some of a communication environment and a communication state of the electronic device and the external electronic device.

16. The method of claim 12, wherein the synchronizing includes:
adjusting a method of processing the audio data, to adjust the third audio latency to correspond to the initial audio latency.

17. The method of claim 16, wherein the adjusting includes: at least one of
adjusting a reference level of a receiving buffer storing the received audio data;
adjusting a time to store the audio data in the receiving buffer; or
adjusting a rate of outputting the audio data stored in the receiving buffer through a decoder.

18. The method of claim 17, wherein the adjusting of the rate includes:
adjusting a rate of outputting the audio data for a specified time within a specified range with respect to a reference rate.

19. The method of claim 16, wherein the adjusting includes:

adjusting a sampling rate of the audio data output from a receiving buffer storing the received audio data.

20. A non-transitory recording medium storing computer-readable instructions
wherein the instructions, when executed by an electronic device, cause the electronic device to:
obtain image data using a camera;
receive audio data recorded by an external electronic device and information on first audio latency from the external electronic device;
determine a second audio latency required to process the received audio data by the electronic device;
determine a third audio latency based on the first audio latency and the second audio latency;
determine a difference between a preset initial audio latency and the third audio latency;
synchronize the audio data with the image data based at least in part on the difference; and
generate an image content including the image data and the audio data based at least in part on the synchronization result.

\* \* \* \* \*